(12) United States Patent
Roelle et al.

(10) Patent No.: US 12,240,394 B2
(45) Date of Patent: Mar. 4, 2025

(54) MOTOR VEHICLE HAVING A PLURALITY OF CONTROL DEVICES WHICH PROVIDE DIFFERENT VEHICLE FUNCTIONS IN THE MOTOR VEHICLE AND METHOD FOR CONFIGURING THE CONTROL DEVICES AND CONTROL DEVICE

(71) Applicant: Bayerische Motoren Werke Aktiengesellschaft, Munich (DE)

(72) Inventors: Christopher Roelle, Groebenzell (DE); Anton Sifferlinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/272,412

(22) PCT Filed: Jan. 25, 2022

(86) PCT No.: PCT/EP2022/051526
§ 371 (c)(1),
(2) Date: Jul. 14, 2023

(87) PCT Pub. No.: WO2022/175026
PCT Pub. Date: Aug. 25, 2022

(65) Prior Publication Data
US 2024/0383416 A1    Nov. 21, 2024

(30) Foreign Application Priority Data
Feb. 17, 2021   (DE) .................... 10 2021 103 757.3

(51) Int. Cl.
*B60R 16/023* (2006.01)
*G06F 3/14* (2006.01)
*H04L 12/40* (2006.01)

(52) U.S. Cl.
CPC ........ *B60R 16/0231* (2013.01); *G06F 3/1446* (2013.01); *H04L 12/40032* (2013.01); *H04L 2012/40273* (2013.01)

(58) Field of Classification Search
CPC .............. B60R 16/0231; G06F 3/1446; H04L 12/40032; H04L 2012/40273
See application file for complete search history.

(56) References Cited

U.S. PATENT DOCUMENTS

2006/0282549 A1   12/2006   Vinnemann
2008/0307131 A1   12/2008   Simon

FOREIGN PATENT DOCUMENTS

DE   10 2008 004 125 B4   12/2009
DE   10 2005 056 294 B4    4/2016
(Continued)

OTHER PUBLICATIONS

International Search Report (PCT/ISA/210) issued in PCT Application No. PCT/EP2022/051526 dated May 31, 2022 with English translation (4 pages).
(Continued)

*Primary Examiner* — Jacob M Amick
*Assistant Examiner* — Charles J Brauch
(74) *Attorney, Agent, or Firm* — Crowell & Moring LLP

(57) ABSTRACT

A motor vehicle has a plurality of control devices which are designed to provide a particular vehicle function in the motor vehicle. The vehicle functions of the control devices differ. The control devices are connected by a common bus line which is led successively through a respective communications circuit of the control devices, wiring the control devices successively into a daisy-chain circuit. Each of the vehicle functions is implemented in each of the control devices. A processor circuit is designed to determine a position specification which specifies a position of the
(Continued)

particular control device within the daisy-chain circuit and, according to the determined position specification, to select a vehicle function allocated to the position from the implemented vehicle functions and to provide the selected vehicle function in the motor vehicle for activation.

12 Claims, 1 Drawing Sheet

(56) References Cited

FOREIGN PATENT DOCUMENTS

| EP | 1 573 974 B1 | 7/2006 |
|---|---|---|
| WO | WO 2010/074677 A1 | 7/2010 |
| WO | WO 2010/147516 A1 | 12/2010 |
| WO | WO 2017/024226 A1 | 2/2017 |

OTHER PUBLICATIONS

German-language Written Opinion (PCT/ISA/237) issued in PCT Application No. PCT/EP2022/051526 dated May 31, 2022 (8 pages).

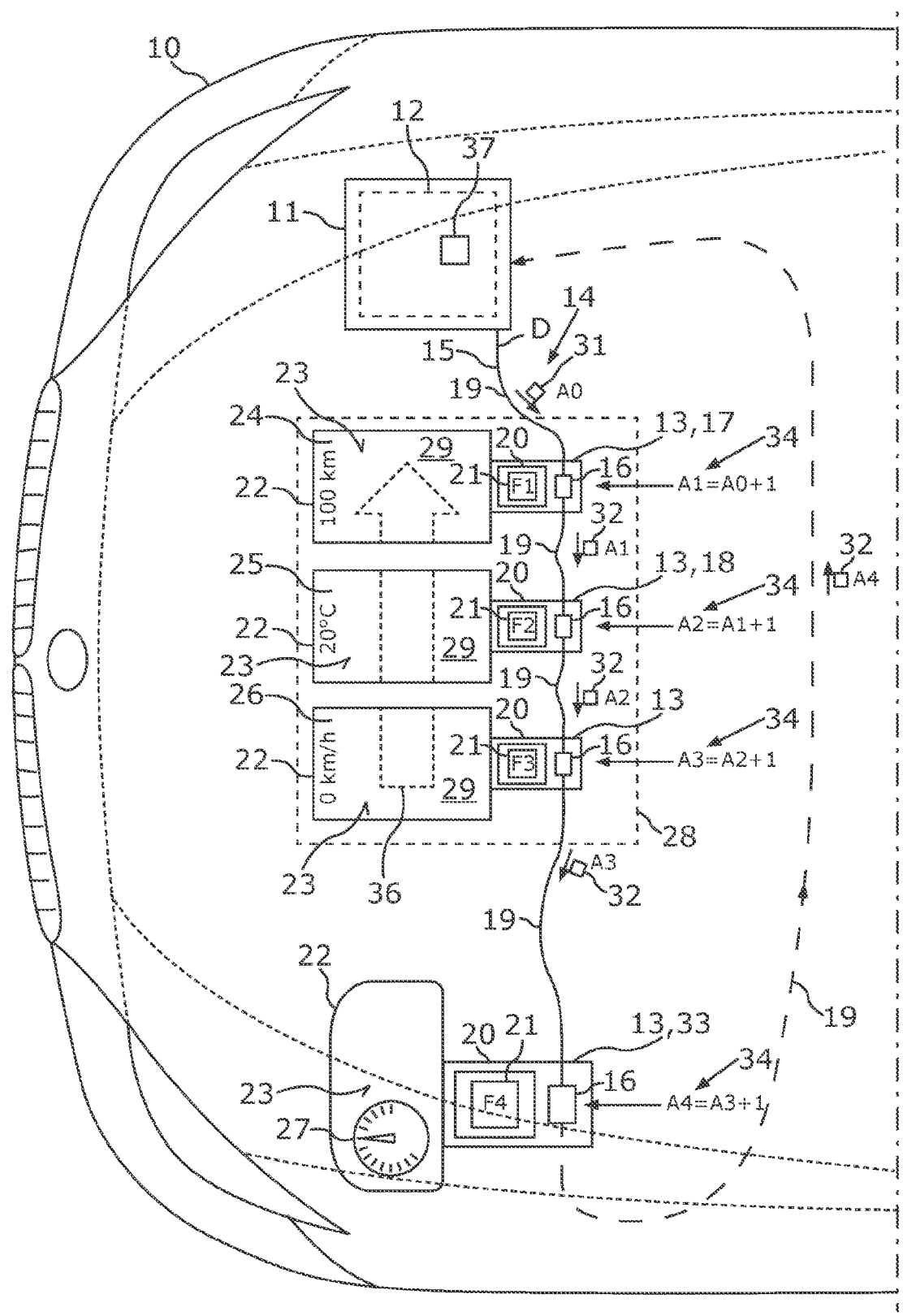

MOTOR VEHICLE HAVING A PLURALITY OF CONTROL DEVICES WHICH PROVIDE DIFFERENT VEHICLE FUNCTIONS IN THE MOTOR VEHICLE AND METHOD FOR CONFIGURING THE CONTROL DEVICES AND CONTROL DEVICE

BACKGROUND AND SUMMARY

The invention relates to a motor vehicle having a plurality of control devices, which are configured to provide a respective vehicle function in the motor vehicle, wherein the vehicle functions of the control devices are different. The control devices are connected by a common bus line, for example, to be able to activate them so that they execute their vehicle function. The invention also includes a corresponding control device for a motor vehicle and a method for configuring control devices in a motor vehicle, so that the control devices configure or provide a respective vehicle function, so that they can be executed.

Currently, vehicles have bi-uniquely identified control devices, in that, for example, during the production of the control devices a device-individual progressive serial number or item number is stored. This can result in an error later during the installation of the devices if two control devices are interchanged, so that the control devices are not located at the intended installation position. If, for example, such an incorrectly installed control device is activated via a bus line on the basis of its item number, the control device does execute the vehicle function provided by it because it is located at the incorrect installation position for this purpose. One example of such control devices are thus for display modules, of which a plurality can be connected via a bus line to a vehicle computer, so that they can output display values to a vehicle occupant.

It is known from DE 10 2008 004 125 B4 that a plurality of control circuits can be connected to one another via a flat band cable of a data bus, wherein data bits are applied simultaneously to all control circuits via data lines of the flat band cable extending in parallel. To assign bus addresses for the control circuits, two further lines are provided, which alternately have line interruptions between each two of the control devices, so that in each case only one of the two lines is electrically conductive between these control devices. A signal for triggering a readdressing is transmitted in succession via these two lines, while the respective address to be used is specified via the parallel data lines. If a control circuit has received an address assignment signal and stored the bus address specified for this purpose, it passes on the address assignment signal to the next control circuit, which then receives the next bus address via the data lines. A controller is necessary for specifying the bus address, which emits the respective bus address to be used via the data lines.

A method for assigning bus addresses to bus users is known from DE 10 2005 056 294 B4. Each bus user is supplied in succession with a bus address, in that the bus address currently to be assigned is communicated to all bus users via a broadcast telegram, but a further signal is communicated to only one bus user outside the bus line, that only this user can detect, so that only this bus user stores the bus address currently to be assigned. Therefore, a further communication path is always necessary in addition to the bus line.

A self-assignment for bus addresses is known from EP 1 573 974 B1, in which bus users are connected to one another in the bus system via a daisy-chain circuit. This daisy-chain circuit only takes place during an address assignment, for which purpose the bus users require additional switching means for separating the bus line into bus branches. For the address assignment itself, each control device checks whether an electrical parameter at the outgoing bus branch indicates that still a further control device is connected downstream. If this is not the case, such a control device assigns an address to itself and changes its switching state, due to which the electrical parameter changes for the next of the control devices, so that the control device there also assigns an address to itself. This address assignment is based on an accurate measurement of electrical parameters and time values, which requires correspondingly complex and accurate circuits.

The invention is based on the object of installing control devices in a motor vehicle having specific different vehicle functions at the correct installation location in each case, where the respective vehicle function will be required or is provided.

The object according to the invention is achieved by the subject matter of the independent claims. Advantageous refinements of the invention result by way of the features of the dependent claims and are described by the following description and the FIGURES.

A motor vehicle having a plurality of control circuits or control devices is provided by the invention. The control devices are configured to provide a respective vehicle function in the motor vehicle, wherein the vehicle functions of the control devices are different and wherein the control devices are connected by a common bus line, which is guided or laid in succession through a respective communication circuit of the control devices, and in this way the control devices are connected one after another to form a daisy-chain circuit. The control devices thus share a common bus line, wherein, as will be described, a continuous bus line does not have to be provided which also electrically connects all control devices. The bus line is guided or laid within the control devices through their respective communication circuit, so that data or bus messages or bus telegrams are transmitted along the bus line through the communication circuits lying on the transmission path. Another designation for the daisy-chain circuit is also series circuit or chain circuit.

In order to avoid the control devices having their different vehicle functions being able to be installed in the motor vehicle at interchanged installation positions, it is provided according to the invention that each of the vehicle functions is implemented in each of the control devices and a processor circuit is configured to ascertain a position specification, which specifies a position of the respective control device within the daisy-chain circuit (thus which number control device it is in each case in the daisy-chain circuit), and to select a vehicle function assigned to the position from the implemented vehicle functions in dependence on the ascertained position specification and to offer the selected vehicle function, in particular only the selected vehicle function or only the plurality of vehicle functions assigned to the position, in the motor vehicle for an activation. "Implementation" of a vehicle function means here that program code or software for each of the vehicle functions is saved or stored or provided in the processor circuit of the respective control device. Each of the vehicle functions can thus be potentially provided by each of the control devices at each of the installation functions. If the vehicle function is a hardware-bound vehicle function or a vehicle function provided by hardware or a circuit or a component, each of the control devices is equipped with the corresponding hardware and/or the corresponding component. The control devices are thus generic, that is to say they can be installed at each installation position and can each provide or execute there the vehicle function provided for this installation position. Each control device therefore only has to find out at which installation position it has been installed in order to select the correct at least one vehicle function, thus the one provided for this installation position. Each of the control devices can execute for this purpose a detection routine, for example, by way of its processor circuit, so that it can be independently recognized by the control device at which position along the daisy-chain circuit the control devices is located. An installation position in the motor vehicle thus corresponds to a respective position in the daisy-chain circuit. It can accordingly thus be ensured or provided by laying or by wiring the installation positions using the bus line that upon installation of the control devices in the installation position and connection of the respective control device to the bus line, the position of the control device within the daisy-chain circuit is a signal or a notification of the corresponding installation position in the motor vehicle. If the processor circuit recognizes a specific position of the respective control device within the daisy-chain circuit in a control device, this position is thus assigned a corresponding installation position in the motor vehicle and the processor circuit can select at least one vehicle function assigned to the position in the daisy-chain circuit and thus the installation position in the control device and to operate or provide or offer for activation the selected vehicle function. In particular, only this vehicle function is offered for activation and the other implemented vehicle functions remain deactivated or inactivated. Offering means that the respective vehicle function can be called up or triggered in the control device, for example by an external activation, for example via the bus line or by an operation by a user. Each of the control devices thus represents a component in the motor vehicle in which all required items of information are provided or stored, to be able to assume each role within the daisy-chain circuit, in that a generic set of different vehicle functions is provided in the control device and only the vehicle function provided for the installation position is unlocked or provided in the motor vehicle for the selection or activation.

The advantage results due to the invention that the control devices can each be installed or mounted without prior sorting or selection at each in each case any of the installation positions in the motor vehicle provided for the control devices as a whole and then each control device selects on the basis of its position in the daisy-chain circuit the one of the vehicle functions which belongs to or matches with the installation position. A control device therefore cannot be interchanged upon the installation of the control device in the motor vehicle, since each control device can be installed for the installation at any of the possible installation positions for the control devices.

The invention also comprises refinements which result in nontrivial additional technical advantages.

One refinement comprises that the bus line in each control device is interrupted by its communication circuit and is therefore separated into bus branches, so that two bus lines end at each communication circuit or at each communication circuit up to the last communication circuit in the daisy-chain circuit. Each two of the control devices are therefore connected via a separate bus branch of the bus line. Each of the control devices or each up to the last of the control devices in the daisy-chain circuit are configured to receive along the daisy-chain in series by means of its communication circuit via one of its bus branches a request message having a position specification (incoming bus branch), to ascertain the ego position specification in dependence on the received position specification, and in turn to emit a request message having the ego position specification just ascertained to the next control device in the daisy-chain circuit by means of its communication circuit via the other of its bus branches (outgoing bus branch). The bus line is thus separated by the communication circuits into individual bus branches, so that a bus message or a bus telegram is only transmitted in the bus line past a control device to the next one if the control device itself actively reads out the bus message or the bus telegram from the incoming bus branch by means of its communication circuit and emits or outputs it again in the outgoing bus branch to the next control device. The bus line can be provided in this case for unidirectional or bidirectional communication. The bus line can be single-wire or multi-wire. It can be designed as a flat cable or twisted-pair cable or coaxial cable or optical line, to mention only some examples.

An exemplary detection routine for the ascertainment of the ego position specification can provide in the respective control device, for example, that by incrementing a counter or counter value, the ego position specification is ascertained, so that the first control device assigns itself the order number 1, for example, and communicates this order number to the next control device, which then assigns itself the order number 2 as the position specification by incrementing and signals this to the next control device. However, the ego position specification can be ascertained by the detection routine additionally or alternatively by means of an assignment rule, for example a table, in dependence on the received position specification, which specifies, for example, a statement about the installation position (for example, "instrument cluster" or "head-up display" or "center console"). In that in succession first the first control device in the daisy-chain circuit assigns itself an ego position specification by means of its detection routine and then triggers or prompts in the next control device the ascertainment of the ego position specification there by means of this ego position specification, the predecessor in the daisy-chain circuit (thus the predecessor control device) therefore determines the function or the vehicle function in the following control device. This assignment or ascertainment of the position takes place in an initialization mode, which can be triggered in that the first request message is transmitted to the first control device of the daisy-chain circuit, thus a control device at one end of the daisy-chain circuit, by a vehicle computer, which can contain as the position specification the position 0 or −1, for example, whereupon the ascertainment of the ego position specification takes place in the first control device. Therefore, due to the series circuit or daisy-chain circuit, after the installation of the control devices, a position in the daisy-chain circuit or chain can be ascertained independently by each control device by this predecessor-successor principle.

One refinement comprises that each of the control devices is configured to ascertain a device-individual bus address for bus communication as the position specification and to form the bus address (for example by means of a mapping table) from the ascertained position specification. To also use the position specification for a bus communication, a device-individual bus address for bus communication can therefore be ascertained as the position specification or the bus address can be derived or formed from the ascertained position specification (for example "third control device in the circuit"), which can be carried out, for example, by means of a mapping table or an assignment rule. Therefore, a unique bus address therefore also results for each installation position, so that by addressing a bus message or a bus telegram to this bus address, the corresponding control device in this installation position, which is associated with this bus address, is addressed or controlled.

The vehicle function which is provided by the respective control device in dependence on the position in the daisy-chain circuit and/or the installation position can be, for example, an output graphic or a light provided in each case for the installation position. Depending on the installation position, this results in a different output graphic or light, to mention only examples. The vehicle function can additionally or alternatively thereto also provide that the control device uses a device-individual bus address in the bus communication via the bus line, thus is addressed on the bus line via a specific bus address used only for this control device. In other words, the respective control device only reacts to the bus address with the execution or processing of the respective bus message or the bus telegram addressed to this bus address. The control device is then configured to accept bus messages under this bus address as the vehicle function or as a component of the vehicle function (to process their message content or to execute a control command contained in the bus message) and/or to send bus messages having this bus address as the sender. However, each control device can communicate in the described manner under every possible bus address, since all vehicle functions and thus all bus addresses are implemented. However, the respective control device restricts itself to the bus address which corresponds to the position in the daisy-chain circuit. One refinement accordingly comprises that the vehicle function comprises using the device-individual bus address for a bus communication via the bus line.

One refinement comprises that some or all of the control devices are structurally identical and/or have identical item numbers and/or model numbers. It is thus possible, therefore, to produce the control devices in an identical or uniform production process. In the production process, care does not have to be taken about the installation position in the motor vehicle in which each of the control devices is ultimately installed. Each of the control devices configures itself in the described manner by ascertaining the position specification itself, after it has been installed.

One refinement comprises that some or all of the control devices are each connected to a display module and are configured to control the respective display module by means of the selected vehicle function. A graphic output via a plurality of display modules, which are structurally identical, can thus be provided in the motor vehicle, so that upon the installation of the display modules, no separate measure is necessary such that a confusion of the display modules during the installation in the installation positions would have to be prevented. A display module can be based, for example, on the foundation of micro-LEDs and/or OLEDs (organic light-emitting diodes), or TFTs. The display modules are addressable via the bus line, so that the display content of the display modules can be defined or controlled via the control devices.

One refinement comprises that a plurality of the display modules in a display device are combined to form a multi-part display, which has an overall display surface, and the position of the control device of the respective display module within the daisy-chain circuit corresponds to a position of the associated display module in the overall display surface. In other words, a display device or a display can be provided which has an overall display surface which is larger than the individual display surface of each of the display modules. Each of the display modules represents a respective display panel of the overall display surface. It can thus be provided, for example, that the display modules are arranged flush adjacent to one another, so that the overall display surface results as a closed surface. Where the respective display surface of each display module is arranged within the overall display surface (for example at the edge or in the middle) coding is based on the position of the control device in the daisy-chain circuit, in that a corresponding assignment is given by the arrangement of the bus line in the motor vehicle. An overall display surface in the motor vehicle can therefore be provided using inexpensive smaller display modules, without a costly correspondingly large individual display module, which provides the overall display surface, having to be provided. Nonetheless, upon the assembly or the provision of the overall display surface, interchanging the control devices cannot cause a flawed display or a flawed display content due to interchanged control devices.

One refinement comprises that each of the control devices includes an ASIL and starting from the first control device in the daisy-chain circuit, the control devices are arranged in descending order according to their ASIL. The ASIL describes a safeguard of the respective control device against a failure thereof or a failure of its functionality. In that the control devices are connected in descending order according to their ASIL, in the event of failure of a control device, if in this way the bus communication in the bus line to following control devices is interrupted, only such a control device is affected, which has the same or a lesser ASIL. Control devices having identical ASIL are naturally to be connected directly in succession according to the order here. It can thus be ensured that the first control device can still be addressed or operated via the bus line even if all other control devices or a downstream control device fails.

Additionally or alternatively, it can be provided that at least one bypass switch is provided in the respective communication circuit, which bypasses the electrical separation between the connected bus branches upon detecting a defect or a lack of functionality or a failure of the control device, so that the incoming bus branch and the outgoing bus branch are electrically bypassed or electrically connected in the communication circuit, i.e., even in the case of inactive or switched-off communication circuit, data can be transmitted through the communication circuit in the bus line, since the bus branches are electrically connected to one another. A transistor switch can be provided in each case as the respective bypass switch, for example. The respective bypass switch can be implemented, for example, by the processor circuit of the control device and/or by a monitoring unit of the communication circuit itself. A monitoring unit can include, for example, an integrated circuit, which can provide, for example, a so-called watchdog functionality for the control device.

In conjunction with the designation "first control device", this means here that control device which is connected via the bus line directly or without interconnection of a further of the control devices to a vehicle computer. The last control device in the daisy-chain circuit is accordingly located at the other end. In the vehicle computer, each of the control devices is therefore differently activatable according to its position in the daisy-chain circuit or according to its installation position in the motor vehicle in that the corresponding vehicle function is used. In particular if the usage of a unique bus address in each control device is also provided as a vehicle function, it can be defined in the vehicle computer by selection of a corresponding bus address which control device is activated at which installation position by the vehicle computer via the bus line.

One refinement accordingly comprises that the control device of one end of the daisy-chain circuit (namely said first control device) is connected via the bus line to a vehicle computer of the motor vehicle, which is configured to activate the control devices in dependence on their position in the daisy-chain circuit and/or their installation position and/or in dependence on their vehicle function via the bus line.

One refinement comprises that the bus line is additionally returned to the vehicle computer originating from the control device of the other end of the daisy-chain circuit and the vehicle computer has a monitoring routine, which is configured to transmit a first message to the control device of the one end of the daisy-chain circuit via the bus line and to check whether a second message triggered by this message may be received from the control device of the other end, and if the second message does not appear, to signal an interrupted bus line. In other words, a ring line is formed by the bus line, which originates from the vehicle computer, is led in succession through the communication circuits of the control devices, and leads back again to the vehicle computer. If a first message is then sent to the first control device and if the control device passes on this message or also triggers the generation of a message in the following or downstream control device, ultimately in a domino effect a message, which is designated here as the second message, is likewise generated by the last control device in the daisy-chain circuit, which is then transmitted back via the returned bus line to the vehicle computer. If the second message is received, it is thus confirmed in the vehicle computer that the bus line is complete or intact and all control devices are ready to receive. If the second message does not appear after a predetermined maximum waiting time, the bus line is thus interrupted, for example because it is damaged, and/or one of the control devices has failed and therefore the daisy-chain circuit is interrupted by its communication circuit. The first message can be, for example, the described request message to ascertain the ego position of the control devices. If the last control device in the daisy-chain circuit then also sends such a request message in the returned bus line, thus in the last bus branch, to the vehicle computer, the computer thus knows that the last control device has also ascertained its position. It can even be ascertained by the second message how many control devices in total are connected in the bus line. Enumeration of the control devices can thus be triggered by the first message and it can be ascertained in the vehicle computer whether the ascertained number of control devices corresponds to a specified target number. If the ascertained number is unequal to the target number, an error signal can thus be generated.

The invention also provides a control device for a motor vehicle. The control device includes a communication circuit to be connected to a bus line and a plurality of predetermined vehicle functions are implemented in a processor circuit of the control device, wherein the processor circuit is configured to ascertain a position specification which specifies a position of the control device within a daisy-chain circuit formed by the bus line, and to select a vehicle function assigned to the position from the implemented vehicle functions in dependence on the ascertained position specification and to offer the selected vehicle function in the motor vehicle for an activation. A plurality of control devices of this embodiment can therefore be installed in a motor vehicle without a risk of interchanging in a motor vehicle.

Of course, the invention also provides refinements of the control devices as have already been described in conjunction with the refinements of the motor vehicle according to the invention.

The invention also provides a method for configuring control devices in a motor vehicle, so that a vehicle function is provided by the control devices, wherein the vehicle functions of the control devices are different and the control devices are connected by a common bus line, which is led in succession through the control devices and in this way the control devices are connected one after another to form a daisy-chain circuit.

To avoid confusion during the installation of the control devices, it is provided that each of the vehicle functions is implemented in each of the control devices and a processor circuit ascertains a position specification, which specifies a position of the respective control device within the daisy-chain circuit, and selects a vehicle function from the implemented vehicle functions assigned to the position in dependence on the ascertained position specification and provides the selected vehicle function in the motor vehicle for activation. The method according to the invention therefore results in operation of the motor vehicle according to the invention when the control devices independently ascertain their position in the daisy-chain circuit therein.

The invention also comprises refinements of the invention which are characterized by those features as have already been described in conjunction with the refinements of the motor vehicle according to the invention.

Further features of the invention result from the claims, the FIGURES, and the description of the figures. The features and combinations of features mentioned above in the description and the features and combinations of features mentioned hereinafter in the description of the figures and/or shown solely in the figures are usable not only in the respective specified combination but also in other combinations or alone.

The invention will be explained in more detail on the basis of a preferred exemplary embodiment and with reference to the drawing.

BRIEF DESCRIPTION OF THE DRAWING

The FIGURE is a schematic representation of an embodiment of the motor vehicle according to the invention, which can carry out an embodiment of the method according to the invention.

BRIEF DESCRIPTION OF THE DRAWING

The FIGURE shows a motor vehicle 10, which can include a vehicle computer 11 in a manner known per se. The motor vehicle 10 can be embodied, for example, as a road vehicle, for example a passenger vehicle. However, this is only to be understood as an exemplary embodiment. The vehicle computer 11 can include a processor circuit 12, which can comprise, for example, one microprocessor or a plurality of microprocessors. A plurality of control devices 13 can be activated by the vehicle computer 11, which can be connected for this purpose one after another in a series circuit or daisy-chain circuit 14 via a bus line 15. The bus line 15 can be single-wire or multi-wire, as already described. Each of the control devices 13 can be connected to the bus line 15 by means of a communication circuit 16, which can be designed in such a way that data or messages or telegrams transmitted from the vehicle computer 11 via the bus line 15 are received in the communication circuit 16 of the first control device 13 (additionally provided here with the reference sign 17) and the bus line 15 is interrupted or separated in such a way that the data do not go further to the next control device 13 (additionally provided here with the reference sign 18), but only for the case that the communication circuit 16 itself emits the data again to the next control device 18, which can in turn receive the data. In other words, the bus line 15 is divided into bus branches 19 by the communication circuits. The communication circuits 16 can be designed in a manner known per se as so-called bus controllers or bus connections.

This control device 13 can additionally include a processor circuit 20, by means of which a vehicle function 21 can be provided in each case in the control device 13, which differ from one another, which is illustrated in the FIGURE by the use of the different designations F1, F2, F3, F4. Each control device 13 can also provide more than one vehicle function 21, thus in each case can provide a range of functions made up of a plurality of vehicle functions, wherein the ranges of functions of the control devices 13 differ from one another. Examples of vehicle functions 21 can be: the use of a device-individual bus address for the data bus D having the bus line 15; an activation function for a respective display module 22, which can be connected in each case to the control device and generates different graphics or display contents 23, control functions for different circuits connected to the control device.

The FIGURE shows by way of example how a total mileage 24, a room temperature 25, a vehicle velocity 26, a tachometer 27, to mention only examples, can be displayed on the different display modules 22, which are shown here by way of example, as a function F1. The vehicle computer 11 only has to send the current value here and the corresponding display content 23, thus the corresponding pixel values, can be generated by the control device 13. The FIGURE shows a further exemplary embodiment in which three of the control devices 13 are arranged in a common display device or a common display 28. For example, a common overall display surface 29 can be provided by the three display modules 22, which are activated by the control devices 13 of the display 28, so that each display module 22 functions as a panel for providing a part of the overall display surface 29. The display modules 22 can be arranged flush and each adjoining one another in pairs for this purpose. For example, the display 28 can be a so-called head-up display for the motor vehicle 10.

The display module 22 for the tachometer 27 can be arranged, for example, in an instrument cluster of the motor vehicle.

Although each of the control devices 13 provides a different vehicle function 21, the control devices 13 are nonetheless preferably structurally identical and/or do not have to be distinguished from one another with regard to the production or the assembly of the motor vehicle 10. Rather, each of the control devices 13 can be used for each installation position of the control devices 13. For this purpose, all required vehicle functions 21 are implemented in each of the control devices 13, for example as corresponding software. In order that each control device 13 is then activated or provided for the specific installation position in which the control device 13 is located after assembly, the processor circuit 20 of the respective control device 13 identifies at which position within the daisy-chain circuit 14 the control device 13 is located. For this purpose, originating from the vehicle computer 11, which can be operated as the bus master, for example, a request message 31 can be sent via the data bus D, i.e., the bus line 15, which is intercepted or read in the described manner in the communication circuit 16 of the first control device 17. The request message 31 can specify, for example, an initial bus address A0 as the sender. By means of the communication circuit 16, the processor circuit 20 of the first control device 17 can read the request message 31 and thereupon, for example, as a component of the vehicle function 21, generate a unique bus address A1, for example, by incrementing the received bus address A0. The incrementing can take place according to a predetermined rule, which is symbolically shown as A0+1 in the FIGURE. This is an example of a detection routine. The first control device 17 therefore has a unique bus address A1 and can detect from the value of the bus address (A1) that it is the first control device 17 in the daisy-chain circuit 14. The first control device 17 can now in turn send a request message 32 to the next control device 18 in the daisy-chain circuit 14 and use the ego bus address A1 in this case as the sender. The request message 32 can be read in the control device 18 in the same manner by the processor circuit 20 and, for example, as a component of the vehicle function 21, the control device 18 can generate its own control device-individual bus address A2 by means of its detection routine by incrementing the received bus address A1 (symbolically illustrated as A2=A1+1). This can thus be continued along the daisy-chain circuit 14 by means of further request messages 32. The last control device 33 in the daisy-chain circuit 14 can in turn generate a request message 32, which in case of a bus branch 19 returned back to the vehicle computer 11, signals to this computer that all control devices 13 have been reached via the bus line 15 and the bus line 15 is functional. The respective individual bus address represents a position specification 34, which correlates with a position of the respective control device 13 within the daisy-chain circuit 14 or corresponds thereto. The respective processor circuit 20 of each control device 13 can, additionally or alternatively to the ascertainment of a unique control device-individual bus address as the position specification 34, also in each case select the vehicle function 21 from the entirety of the implemented vehicle functions 21 (thus all vehicle functions F1, F2, F3, F4) and activate it in dependence on this position specification 34. Therefore, for example, the display modules 22 can be structurally identical and each control device 13, each of which activates one of the display modules 22, can define the respective individual embodiment of the display content 23, as was described, in dependence on the position specification 34. Moreover, the display modules 22 within the display 28 can cooperate and the vehicle computer 11 can determine by the position specification 34 or the bus address which part of a comprehensive display content 36 is to be displayed on which display module 22. Therefore, by laying the bus line 15 along the possible installation positions for control devices 13, the prior knowledge or the information can be defined where this installation position will be located in relation to the position within the daisy-chain circuit, which can be stored as an assignment table or as an assignment rule in the vehicle computer 11, i.e., a position assignment 37 can be provided in the processor circuit 12 of the vehicle computer 11, which corresponds to an assignment between installation position and position within the daisy-chain circuit, thus order number (first control device, second control device, and so on).

The described "daisy-chaining" (daisy-chain circuit 14) therefore means that control devices 13 are chained and appended to one another by the bus line 15. The goal is that, for example, display modules 22 of a display 28 arrayed one after another can have the same item number. Therefore, they have to independently identify themselves after installation in order to display corresponding display contents 23 (e.g., total mileage 24, room temperature 25, vehicle velocity 26).

The problem which is overcome is that a plurality of structurally-identical devices have to be installed logically one after another, in particular more than two, but then have to be able to be individually addressed. If, for example, the imaging unit (for example a head unit, i.e., the vehicle computer 11) is to display a display content 23 on display 2 (by means of display module 22), it has to be ensured that the display data also arrive at display 2, although display 2 can be identical in item number to every other display module 22 (thus display 1, 3, and 4 in the example). The item number equality of the display modules 22 connected in series having their control devices 13 is the most interesting case of the series circuit, but the concept also functions with components which do not have identical item numbers.

Due to the series circuit or daisy-chain circuit 14, a position in the chain of the daisy-chain circuit 14 can be ascertained independently by each control device 13 after the installation by the explained predecessor-successor principle. Each component has the required information to be able to assume each role or vehicle function within the chain of the daisy-chain circuit 14 (like a stem cell or generic circuit). The predecessor determines the function of the successor in the daisy-chain circuit 14. Since the components or control devices 13 are also relevant in descending order along the chain (viewed from the HU or the vehicle computer 11), thus are ordered according to their ASIL, a failure of one of the components and the accompanying failure of the following components can be logically treated and reacted to appropriately.

LIST OF REFERENCE SIGNS 10 motor vehicle
11 vehicle computer
12 processor circuit
13 control device
14 daisy-chain circuit
15 bus line
16 communication circuit
17 control device
18 control device
19 bus branches
20 processor circuit
21 vehicle function
22 display module
23 display content
24 total mileage
25 room temperature
26 vehicle velocity
27 tachometer
28 display
29 overall display surface
32 request message
33 control device
34 position specification
36 display content
37 position assignment
D data bus

The invention claimed is:

1. A motor vehicle, comprising:
a plurality of control devices which are configured to provide a respective vehicle function in the motor vehicle, wherein
the vehicle functions of the control devices are different, and
the control devices are connected by a common bus line, which is led in succession through a respective communication circuit of the control devices so as to connect the control devices one after another to form a daisy-chain circuit,
wherein, in each of the control devices:
a) each of the vehicle functions is implemented, and
b) a processor circuit is configured to:
ascertain a position specification, which specifies a position of the respective control device within the daisy-chain circuit, and
select a vehicle function assigned to the position in dependence on the ascertained position specification from the implemented vehicle functions and offer the selected vehicle function in the motor vehicle for an activation.

2. The motor vehicle according to claim 1, wherein
the bus line in each control device is interrupted by its communication circuit and is thus separated into bus branches, so that:
two bus lines end at each communication circuit or at each communication circuit up to the last of the control devices of the daisy-chain circuit, and each of the control devices or each up to the last of the control devices in the daisy-chain circuit, is configured in series to:
receive a request message having a position specification in each case by way of the respective communication circuit via one of its bus branches,
ascertain an ego position specification in dependence on the received position specification, and
send a request message having the ascertained ego position specification to a next control device in the daisy-chain circuit by way of the ego communication circuit via the other of its bus branches.

3. The motor vehicle according to claim 1, wherein
each of the control devices is configured to ascertain as the position specification a device-individual bus address for a bus communication or to form the bus address from the ascertained position specification.

4. The motor vehicle according to claim 3, wherein
the vehicle function comprises using the device-individual bus address for a bus communication via the bus line.

5. The motor vehicle according to claim 1, wherein
some or all of the control devices are structurally identical and/or have identical item numbers and/or model numbers.

6. The motor vehicle according to claim 1, wherein
some or all of the control devices are each connected to a display module and are configured to control the respective display module by way of the selected vehicle function.

7. The motor vehicle according to claim 6, wherein
a plurality of the display modules in a display device are combined to form a multipart display, which has an overall display surface, and the position of the control device of the respective display module within the daisy-chain circuit corresponds to a position of the associated display module in the overall display surface.

8. The motor vehicle according to claim 1, wherein each of the control devices includes an ASIL and, originating from the first control device in the daisy-chain circuit, the control devices are arranged in descending order according to their ASIL.

9. The motor vehicle according to claim 1, wherein the control device of one end of the daisy-chain circuit is connected via the bus line to a vehicle computer of the motor vehicle, which is configured to activate the control devices in dependence on their position and/or in dependence on their vehicle function via the bus line.

10. The motor vehicle according to claim 9, wherein the bus line is additionally returned to the vehicle computer originating from the control device of the other end of the daisy-chain circuit, and the vehicle computer includes a monitoring routine, which is configured to send a first message to the control device of the one end of the daisy-chain circuit via the bus line and to check whether a second message triggered by said message from the control device of the other end may be received, and if the second message does not appear, to signal an interrupted bus line.

11. A control device for a motor vehicle, comprising:

a communication circuit for connection to a bus line; and a processor circuit in which a plurality of predetermined vehicle functions are implemented, wherein the processor circuit is configured to ascertain a position specification, which specifies a position of the control device within a daisy-chain circuit formed by the bus line, and, in dependence on the ascertained position specification, to select a vehicle function assigned to the position from the implemented vehicle functions and to offer the selected vehicle function in the motor vehicle for an activation.

12. A method for configuring control devices in a motor vehicle, so that a respective vehicle function is provided by the control devices, wherein the vehicle functions of the control devices are different and the control devices are connected by a common bus line, which is led in succession through the control devices so as to connect the control devices one after another to form a daisy-chain circuit, the method comprising:

implementing each of the vehicle functions in each of the control devices;

ascertaining, via a processor circuit, a position specification, which specifies a position of a respective control device within the daisy-chain circuit, and, in dependence on the ascertained position specification, selects a vehicle function assigned to the position from the implemented vehicle functions and provides the selected vehicle function in the motor vehicle for activation.

* * * * *